R. A. GIBSON.
PISTON RING FOR HYDROCARBON ENGINES.
APPLICATION FILED MAY 10, 1916.
1,280,708.
Patented Oct. 8, 1918.
2 SHEETS—SHEET 1.
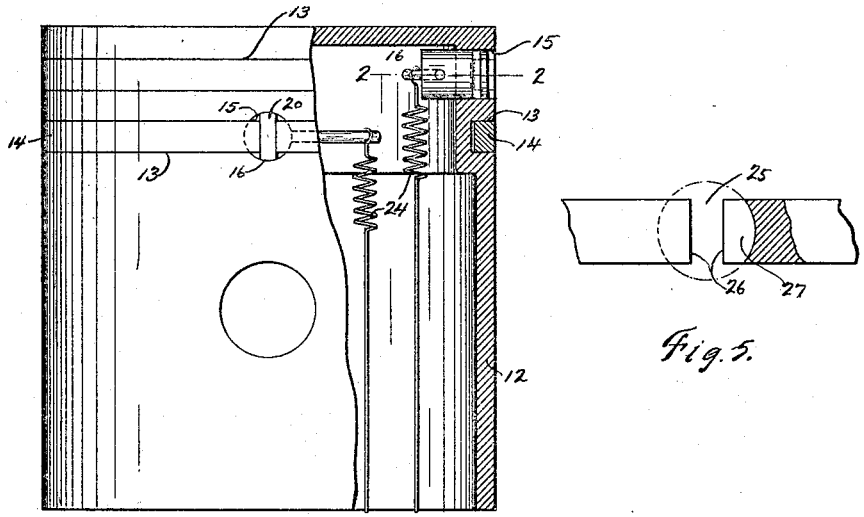
Fig. 1.
Fig. 5.
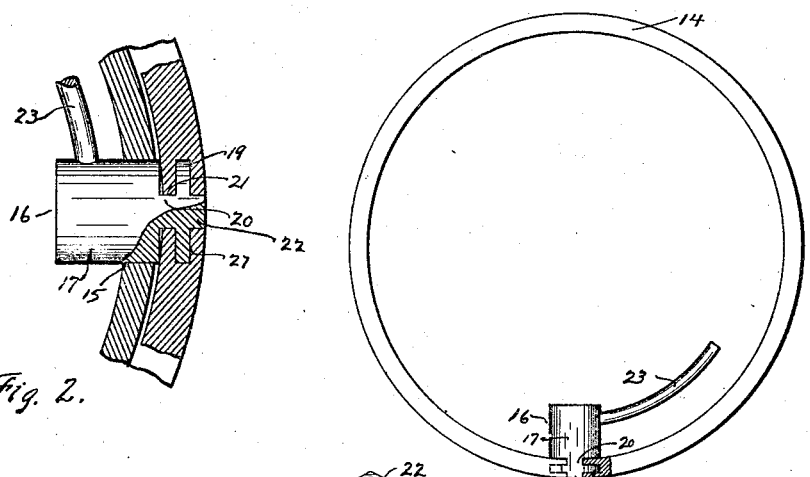
Fig. 2.
Fig. 4.
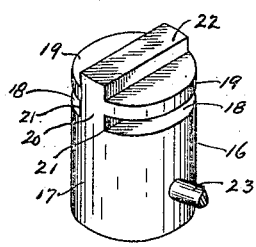
Fig. 3.
WITNESSES:
Walter H. Kelley
Maude Sentz
INVENTOR
Robert A. Gibson
BY J. Wm Ellis
ATTORNEY R. A. GIBSON.
PISTON RING FOR HYDROCARBON ENGINES.
APPLICATION FILED MAY 10, 1916.

1,280,708.

Patented Oct. 8, 1918.
2 SHEETS—SHEET 2.

WITNESSES:
Walter H. Kelley
Maude Lentz

INVENTOR
Robert A. Gibson
BY J. Wm Ellis
ATTORNEY

UNITED STATES PATENT OFFICE.

ROBERT A. GIBSON, OF BUFFALO, NEW YORK.

PISTON-RING FOR HYDROCARBON-ENGINES.

1,280,708.  Specification of Letters Patent.  Patented Oct. 8, 1918.

Application filed May 10, 1916. Serial No. 96,577.

*To all whom it may concern:*

Be it known that I, ROBERT A. GIBSON, a citizen of the United States of America, residing at Buffalo, county of Erie, and State of New York, have invented certain new and useful Improvements in Piston-Rings for Hydrocarbon-Engines, of which the following is a full, clear, and exact description.

One of the principal objects of my invention has been to provide a piston ring which shall produce, throughout its circumference, a uniform pressure upon the inner wall of the cylinder.

Another object has been to provide a ring having a separate expanding means.

Furthermore, my ring does not depend for its spring or expansion upon the metal in the ring itself, so that it may be made considerably heavier than the ordinary ring and of even thickness throughout its circumference. By reason of this construction it is not necessary that the ring be contracted when placed within the cylinder so that it will expand, but it may be made exactly of the same diameter as the bore of the cylinder and thereby make it unnecessary to distort its outer circumference.

Moreover, the expanding means employed in my piston ring makes it possible to make the rings in two parts so that they may be placed within the grooves in the piston without having to be expanded and forced over the outer diameter of the piston.

My invention provides a piston ring which is simple and cheap to manufacture and one which effectively packs the piston within which it is placed.

The above objects and advantages have been accomplished by the device shown in the accompanying drawings, forming part of this application. In the drawings:

Figure 1 is a side elevation of a piston, partly in section, which has been fitted with my piston rings.

Fig. 2 is an enlarged, sectional view through one of the expanding studs and is taken on line 2—2 of Fig. 1.

Fig. 3 is an enlarged, perspective view of the expansion stud of my ring.

Fig. 4 is a plan view of my complete ring showing the expansion stud in position.

Fig. 5 is an enlarged, fragmentary view of the ends of my piston ring.

Figure 8:
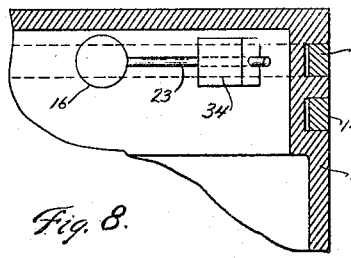
Fig. 8 is a modified form of tension means for the expansion stud.

Referring to the drawings, and more particularly to Figs. 1 to 5 inclusive, 12 is a piston of a hydrocarbon engine which is provided with the usual grooves 13 for the reception of piston rings. In each of the grooves 13 is disposed one of my piston rings 14. Through the wall of the piston and in register with each of the grooves 13, is provided a cylindrical aperture 15 in which is rotatably disposed the expansion stud 16 of my device.

This stud is provided with a body part 17 which is formed in its outer end with two diametrically opposite grooves 18 thus providing tabs 19. The grooves 18 are cut in the same lateral plane and between them is thus provided a central wall 20, the faces 21 of which are preferably parallel to each other. Beyond the outer face of the tabs 19 there is preferably provided a ridge 22 which is of substantially the same width as the width of the wall 20 and arranged in juxtaposition thereto. Each of these studs is provided with an arm 23 which is arranged within the piston and extends preferably at right angles to the wall 20 and ridge 22. This arm is somewhat curved to conform to the inner surface of the piston and connected to its outer end is one end of a helical spring 24. This spring places a tension upon the arm 23 thus tending to rotate the expansion stud 16 about its axis.

My piston ring is provided in its circumference with a cut 25 of substantially the same width as the width of the wall 20 and ridge 22, thus providing faces 26. This cut is made of substantially the same shape as the shape of the cross section of the wall 20 and ridge 22. In the faces 26 of the ends of the ring is provided an arc-shaped groove 27. This cut is arranged centrally of the thickness of the ring and the arc thereof is struck from the same radius as the radius of the tabs 19 of the expansion stud so that the tabs 19 and the wall 20 and ridge 22 snugly fit and co-act with the faces 26 and the faces of the grooves 27, thus keeping the ends of the piston ring in alinement and preventing the leakage of compression past the joint in the ring.

Figure 6:
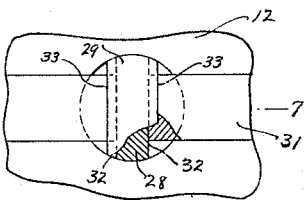
Fig. 6 is a fragmentary, front elevation of my ring with a modified form of expansion stud.
Figure 7:
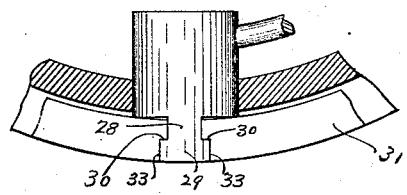
Fig. 7 is an enlarged, fragmentary sectional view of the form of ring shown in Fig. 6 and is taken on line 7—7 of Fig. 6.

In Figs. 6 and 7 I show a modified form of ring and expansion stud. In this form of stud is provided, at one end, a central wall 28, at the end of which is formed a head 29 of greater width than the wall 28 thus providing shoulders or ridges 30. The shape of the head 29 is preferably the same as that of the wall, the sides of which are substantially parallel. The height of the wall 28 and the head 29 is substantially equal to the thickness of the ring 31. The ring 31 is provided with a cut in its circumference of a thickness equal to the thickness of the wall 28 thus providing surfaces 32. Another cut is made from the outside of the ring of substantially the same width as the thickness of the head 29, thus providing faces 33. The last mentioned cut is of such a depth that the ledge formed thereby will register with the shoulders 30 under the head 29 of the stud, thus keeping the ends of the rings in perfect alinement.

In Fig. 8 I show the expansion stud 16 provided with a weight 34 upon its arm 23, instead of the helical spring shown in Fig. 1. In this form the tendency toward rotation of the expansion stud will be caused by gravitation.

Figure 9:
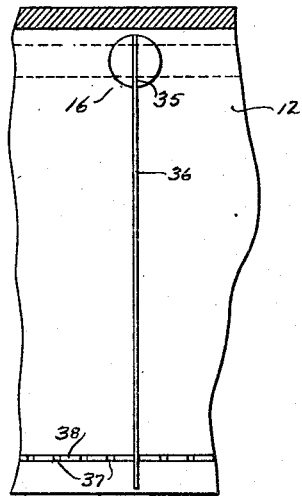
Fig. 9 is another modified form of tension means for the expansion stud.
Figure 10:
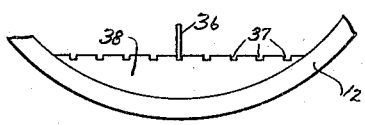
Fig. 10 is an elevation of a part of the modified tension means shown in Fig. 9.

In Figs. 9 and 10 I have shown another modified form of tension means. In this form the stud 16 is provided with a central slot 35 in which is arranged one end of a long, flat spring 36. This spring is preferably arranged axially with the piston and near its lower end is engageable with any one of a plurality of notches 37 cut in a plate 38, suitably secured to the interior of the piston. The tension upon the stud in this form may be varied by moving the lower end of the spring 36 from one notch to another.

Figure 11:
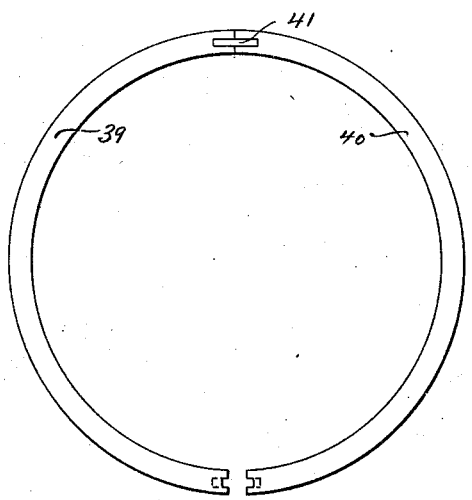
Fig. 11 is a plan view of a modified form of piston ring.

In Fig. 11 I show another modified form of ring. This ring is made considerably thicker than the ordinary piston ring so as to add to its strength and durability. It is therefore made in two parts 39 and 40. At the joint of these two parts there is provided a feather or key 41 which extends the width of the ring and is let into the ends thereof. This key retains the outer ends of the ring in perfect alinement and as the co-acting surfaces are accurately formed, leakage of compression will be prevented by the tension placed upon these surfaces by the expansion stud, when the ring is in position.

As hereinbefore pointed out, my rings do not depend for their expansion upon the spring or the flexibility of the metal and for this reason they may be made exactly the same diameter as the cylinder within which they are to be placed. The width of the wall 20 and ridge 22 or the wall 28 and head 29 may be made exactly the same as the width of the co-acting surfaces on the ends of the ring so that leakage of compression may be prevented. However, in all the forms shown the arm of the expansion stud is placed under tension so that there is a tendency to rotate the same. This tendency to rotate will cause the faces of the wall 20 and ridge 22 or the faces of the wall 28 and head 29 to slightly expand or tend to expand the ring and thus force it tightly against the cylinder. If the ring is made slightly smaller than the diameter of the cylinder, when the ends are expanded, the co-acting surfaces on the expansion stud and the rings will not be in contact throughout their length, but there always will be a point of firm contact so that leakage of compression is thereby avoided.

Obviously, while I have shown and described my ring for use in connection with hydrocarbon engines, it will be understood that it may be used with engines of any type, pumps or compressors, with equal efficiency. If desired, my expansion means may be used in connection with the expanding piston ring used at present. These and other modifications of the details herein shown and described may be made without departing from the spirit of my invention or the scope of the appended claims and I do not, therefore, wish to be limited to the exact embodiment herein shown and described.

Having thus described my invention, what I claim is:

1. The combination with a piston, of a split piston ring comprising a stud member carried by the piston and engaged with the ends of said ring, means carried by said stud member for keeping the ends of said ring in alinement, and means connected with said stud member, whereby it has a normal tendency to rotate and expand said ring.

2. The combination with a piston, of a split piston ring comprising a key-shaped stud member carried by the piston and arranged between the ends of said split ring, means carried by said stud member for keeping the ends of said ring in alinement, and means connected with said stud member, whereby it has a normal tendency to rotate and expand said ring.

3. The combination with a piston, of a split piston ring comprising a stud member passing through the wall of the piston, said stud member being provided with oppositely arranged surfaces engaged with the co-acting surfaces of the ends of said ring, means carried by said stud member for keeping the ends of said ring in alinement, and means connected with said stud member, whereby it has a normal tendency to rotate and expand said ring.

4. The combination with a piston, of a split piston ring comprising a stud member passing through the wall of the piston, said stud member being provided with oppositely arranged flat surfaces, retaining means formed on said stud member and arranged adjacent to said surfaces, said flat surfaces and said retaining means engaged with the coacting surfaces of the ends of said rings, and means connected with said stud member, whereby it has a normal tendency to rotate and expand said ring.

5. The combination with a piston, of a split piston ring comprising a stud member passing through the wall of the piston, said stud member being provided with oppositely arranged surfaces, disposed at substantially right angles to said ring, an arm carried by said stud member, and resilient tension means connected with said arm, whereby it has a normal tendency to rotate and expand said ring.

6. The combination with a piston, of a split piston ring comprising a stud member passing through the wall of the piston, said stud member being formed in its outer end with two oppositely arranged slots, a central wall formed between the slots, oppositely protecting tabs adjacent to said wall, a ridge formed on the end of said member, adjacent to said tabs, said wall, said tabs, and said ridge being engaged with the coacting surfaces of the ends of said ring, and means connected with said stud member, whereby it has a normal tendency to rotate and expand said ring.

7. The combination with a piston, of a two-part ring comprising a stud member passing through the wall of the piston and engaged with one pair of ends of said ring, means carried by said stud member for keeping the ends of said ring in alinement, a joint between the other pair of ends of said ring, and means connected with said stud member, whereby it has a normal tendency to rotate and expand said ring.

In testimony whereof, I have hereunto set my hand in the presence of two subscribing witnesses.

ROBERT A. GIBSON.

Witnesses:
J. WM. ELLIS,
WALTER H. KELLEY.

Copies of this patent may be obtained for five cents each, by addressing the "Commissioner of Patents, Washington, D. C."